United States Patent
Balassanian

(10) Patent No.: US 10,095,467 B2
(45) Date of Patent: Oct. 9, 2018

(54) MUSIC GENERATOR

(71) Applicant: BE LABS, LLC, Seattle, WA (US)

(72) Inventor: Edward Balassanian, Seattle, WA (US)

(73) Assignee: Be Labs, LLC, Seattle, WA (US)

( * ) Notice: Subject to any disclaimer, the term of this patent is extended or adjusted under 35 U.S.C. 154(b) by 144 days.

(21) Appl. No.: 14/846,396

(22) Filed: Sep. 4, 2015

(65) Prior Publication Data

US 2015/0378669 A1    Dec. 31, 2015

Related U.S. Application Data

(63) Continuation of application No. 14/462,360, filed on Aug. 18, 2014, now abandoned, which is a
(Continued)

(51) Int. Cl.
*A63H 5/00* (2006.01)
*G04B 13/00* (2006.01)
(Continued)

(52) U.S. Cl.
CPC ........ *G06F 3/165* (2013.01); *G06F 17/30743* (2013.01); *G06F 17/30755* (2013.01);
(Continued)

(58) Field of Classification Search
CPC .............. G06F 3/165; G06F 17/30743; G06F 17/30755; G06F 17/30778; G10H 1/0025;
(Continued)

(56) References Cited

U.S. PATENT DOCUMENTS

| | | | | |
|---|---|---|---|---|
| 6,297,439 B1 * | 10/2001 | Browne | ............... | G10H 1/0025 84/635 |
| 6,506,969 B1 * | 1/2003 | Baron | .................. | G10H 1/0025 84/609 |
| 7,491,878 B2 * | 2/2009 | Orr | ....................... | G10H 1/0025 84/609 |
| 8,115,090 B2 * | 2/2012 | Miyajima | ............ | G10H 1/0025 84/625 |

(Continued)

OTHER PUBLICATIONS

Yakov Vorobyev and Eric Coomes, "Beyond Beatmatching—Take your DJ Career to the Next Level," Mixed in Key LLC, 2012, 129 pages.

(Continued)

*Primary Examiner* — Jeffrey Donels
(74) *Attorney, Agent, or Firm* — Meyertons, Hood, Kivlin, Kowert & Goetzel, P.C.

(57) ABSTRACT

Techniques are disclosed relating to generating music content. In one embodiment, a method includes determining one or more musical attributes based on external data and generating music content based on the one or more musical attributes. Generating the music content may include selecting from stored sound loops or tracks and/or generating new tracks based on the musical attributes. Selected or generated sound loops or tracks may be layered to generate the music content. Musical attributes may be determined in some embodiments based on user input (e.g., indicating a desired energy level), environment information, and/or user behavior information. Artists may upload tracks, in some embodiments, and be compensated based on usage of their tracks in generating music content. In some embodiments, a method includes generating sound and/or light control information based on the musical attributes.

22 Claims, 3 Drawing Sheets

Related U.S. Application Data continuation of application No. 13/969,372, filed on Aug. 16, 2013, now Pat. No. 8,812,144.

(60) Provisional application No. 61/786,479, filed on Mar. 15, 2013, provisional application No. 61/702,868, filed on Sep. 19, 2012, provisional application No. 61/684,535, filed on Aug. 17, 2012.

(51) Int. Cl.
*G06F 3/16* (2006.01)
*G06F 17/30* (2006.01)
*G10H 1/00* (2006.01)
*G10H 7/00* (2006.01)

(52) U.S. Cl.
CPC ..... *G06F 17/30778* (2013.01); *G10H 1/0025* (2013.01); *G10H 7/008* (2013.01); *G10H 2240/085* (2013.01); *G10H 2240/131* (2013.01)

(58) Field of Classification Search
CPC ............. G10H 7/008; G10H 2240/085; G10H 2240/131
USPC .......................................................... 84/609
See application file for complete search history.

(56) References Cited

U.S. PATENT DOCUMENTS

| | | | |
|---|---|---|---|
| 8,751,030 B2 * | 6/2014 | You | G11B 19/08 700/94 |
| 2005/0267819 A1 * | 12/2005 | Kaplan | G06F 17/30749 705/7.29 |
| 2009/0107320 A1 * | 4/2009 | Willacy | G10H 1/46 84/609 |
| 2009/0157203 A1 * | 6/2009 | Bregar | G11B 20/10527 700/94 |
| 2009/0164034 A1 * | 6/2009 | Cohen | G10H 1/0025 700/94 |
| 2009/0231968 A1 * | 9/2009 | Ochi | G06F 17/30749 369/47.15 |
| 2010/0071535 A1 * | 3/2010 | McKinney | H05B 37/029 84/464 R |
| 2010/0146583 A1 * | 6/2010 | Prehofer | G06Q 30/02 726/1 |
| 2011/0054646 A1 * | 3/2011 | Hernandez | G06F 17/30755 700/94 |

OTHER PUBLICATIONS

International Search Report and Written Opinion in Application No. PCT/US13/55445 dated Jan. 17, 2014, 9 pages.

* cited by examiner

MUSIC GENERATOR

The present application is a continuation of U.S. application Ser. No. 14/462,360, filed Aug. 18, 2014, which is a continuation of U.S. application Ser. No. 13/969,372, filed Aug. 16, 2013 (now U.S. Pat. No. 8,812,144), which claims the benefit of priority to U.S. Provisional Appl. No. 61/786,479, filed Mar. 15, 2013, U.S. Provisional Appl. No. 61/702,868, filed Sep. 19, 2012, and U.S. Provisional Application No. 61/684,535, filed on Aug. 17, 2012; the disclosures of each of the above-referenced applications are incorporated by reference herein in their entireties.

BACKGROUND

Technical Field

This disclosure relates to audio engineering and more particularly to generating music content.

Description of the Related Art

Streaming music services typically provide songs to users via the Internet. Users may subscribe to these services and stream music to a web browser or application. Examples of such services include PANDORA, SPOTIFY, GROOVESHARK, etc. Often, a user can select a genre of music or specific artists to stream. Users can typically rate songs (e.g., using a star rating or a like/dislike system), and some music services may tailor which songs are streamed to a user based on previous ratings. The cost of running a streaming service (which may include paying royalties for each streamed song) is typically covered by user subscription costs and/or advertisements played between songs.

Song selection may be limited by licensing agreements and the number of songs written for a particular genre. Users may become tired of hearing the same songs in a particular genre. Further, these services may not tune music to users tastes, environment, behavior, etc.

SUMMARY

Techniques are disclosed relating to generating music content. In one embodiment, a method includes determining one or more musical attributes based on external data and generating music content based on the one or more musical attributes. In one embodiment, generating the music content may include selecting from stored sound loops or tracks and/or generating new sound loops based on the musical attributes. In one embodiment, selected or generated tracks may be layered to generate the music content.

Musical attributes may be determined, in some embodiments, based on user input, environment information, and/or user behavior information. In some embodiments, user input may indicate musical attributes directly. In other embodiments, user input may include words associated with particular moods, a desired energy level, etc. In some embodiments, environment information may include lighting and/or sound levels, for example. In some embodiments, user behavior information may include user location information and/or user purchasing information, for example.

Artists may upload tracks, in some embodiments, and may be compensated based on usage of their tracks in generating music content. In some embodiments, a method includes generating sound and/or light control information based on the musical attributes. In some embodiments, generating music content may reduce royalty payments for streaming music providers and may provide users with new music content within a particular genre or mood of music.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Figure 1:
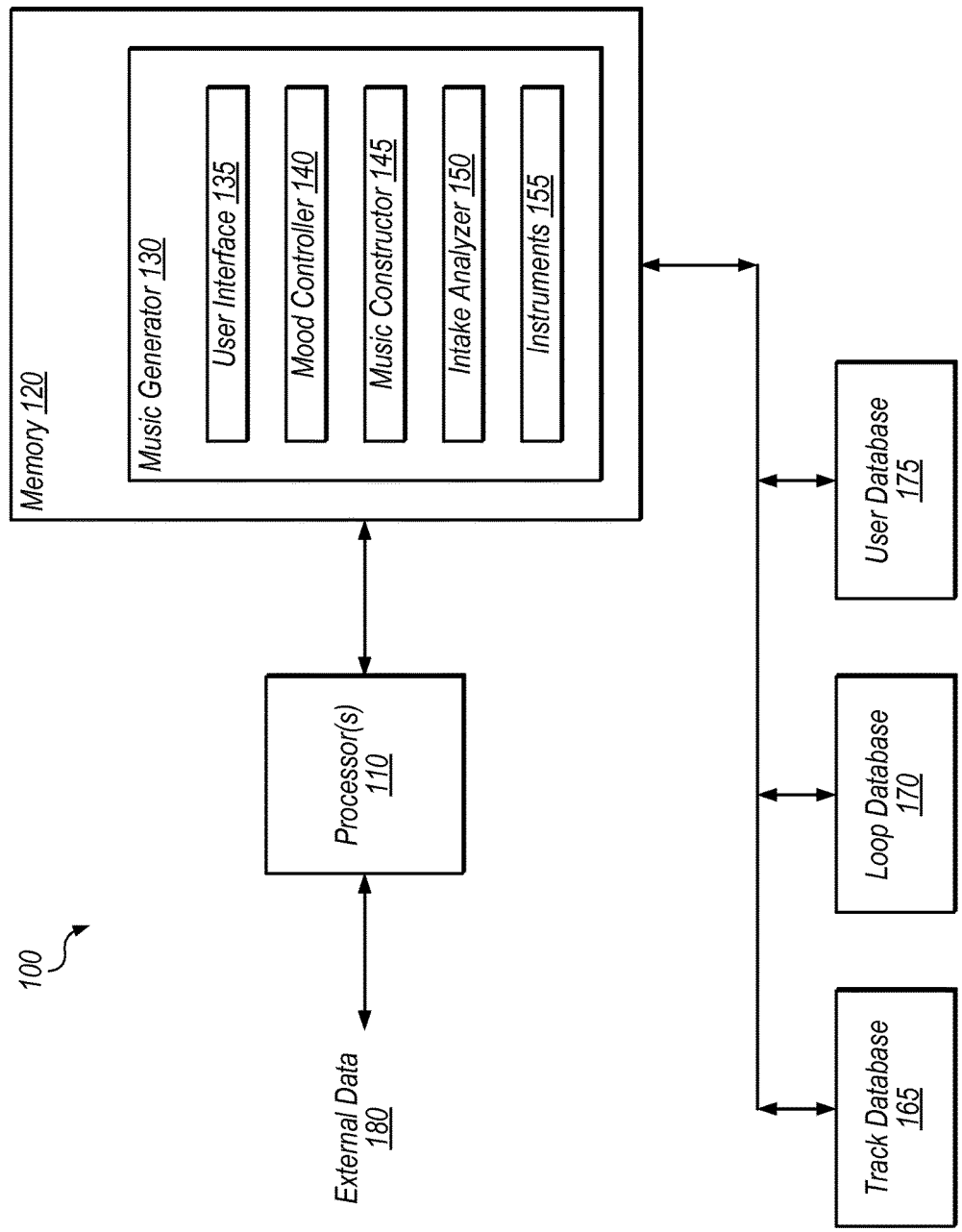
FIG. 1 is a block diagram illustrating one embodiment of a system that includes a music generator.
Figure 2:
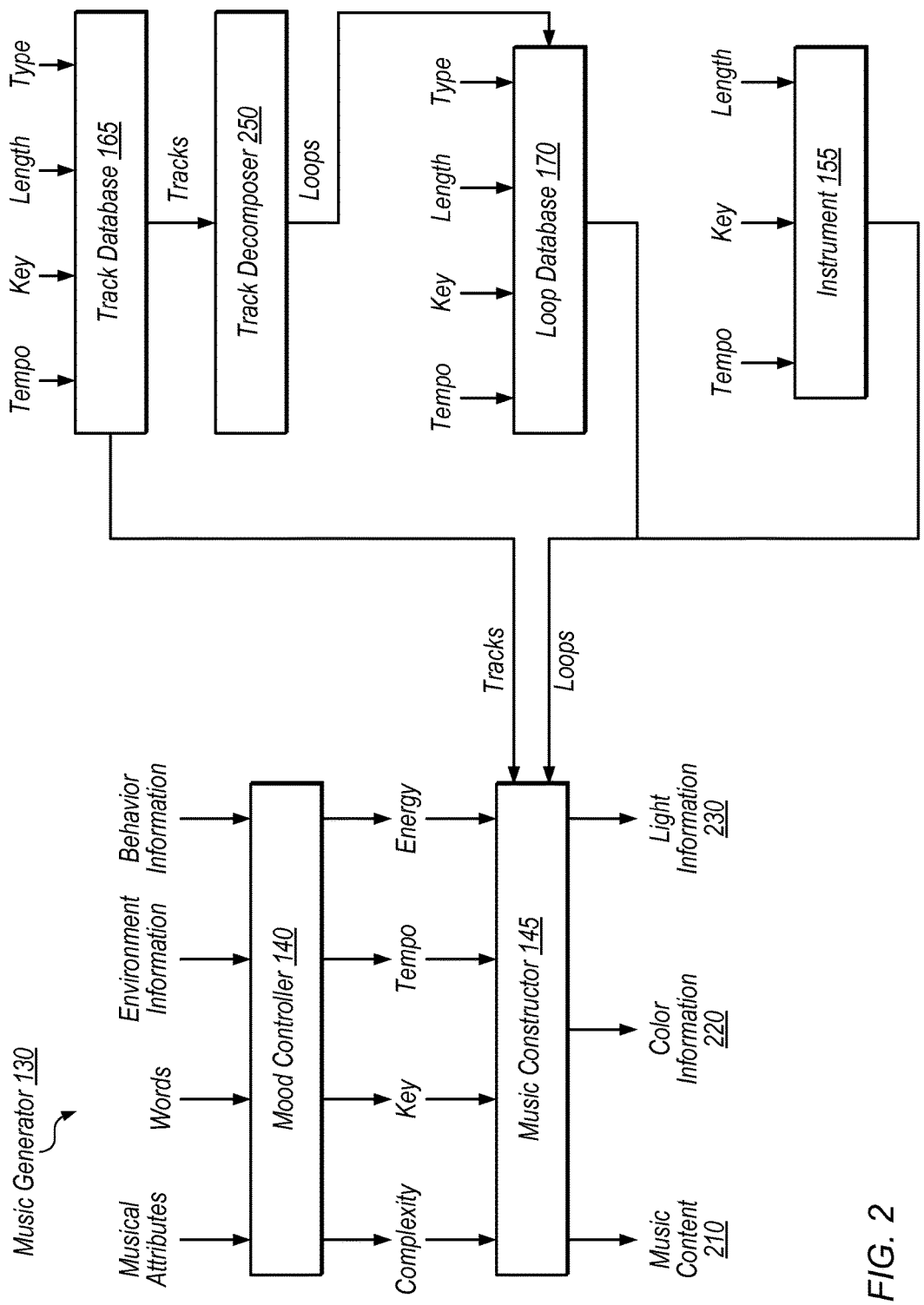
FIG. 2 is a block diagram illustrating an exemplary embodiment of a music generator.
Figure 3A:
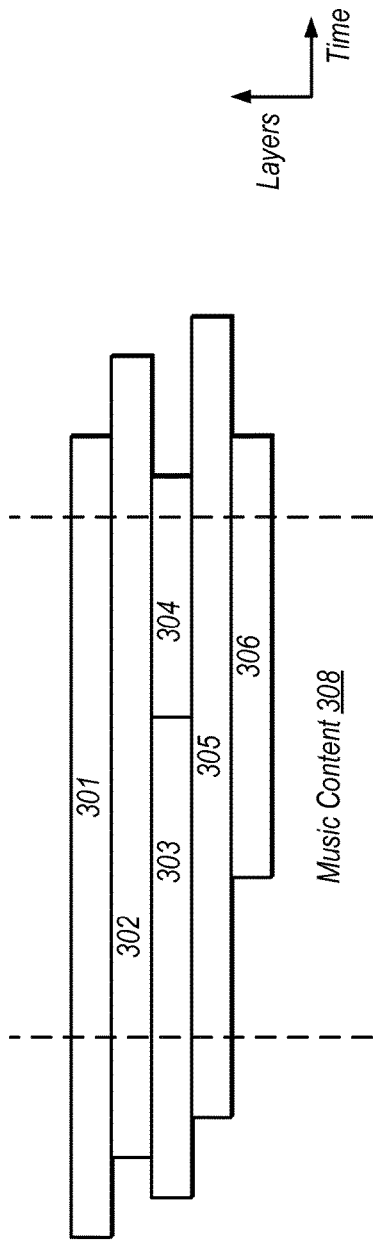
FIG. 3A is a diagram illustrating exemplary sampling of music content.
Figure 3B:
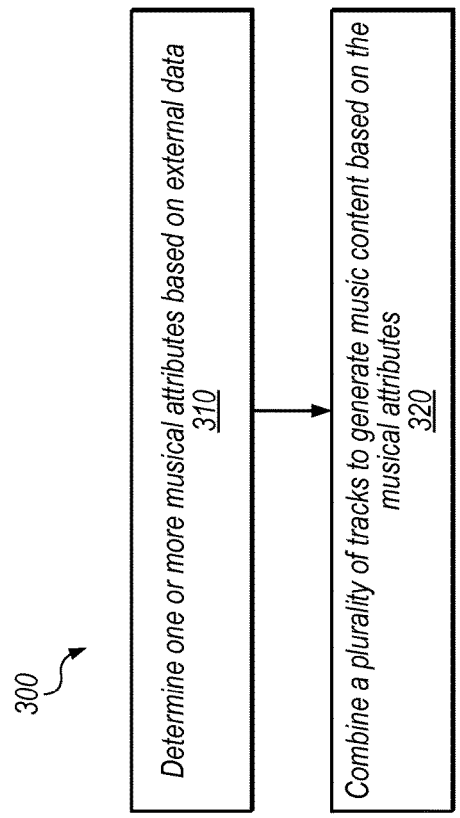
FIG. 3B is a flow diagram illustrating a method for generating music content.

This disclosure initially describes, with reference to FIGS. 1-2, an exemplary system and music generator. It then describes exemplary sampling techniques and an exemplary method for generating music content with reference to FIGS. 3A-3B. In some embodiments, a music generator as described herein may generate music content based on determined musical attributes in order to match user mood, affect customer behavior, match an environment, etc. In some embodiments, such music content may reduce royalty payments by music providers and provide variety within a particular genre or mood of music.

Referring now to FIG. 1, a block diagram illustrating one embodiment of a system 100 for generating music content is shown. In the illustrated embodiment, system 100 includes processor(s) 110, memory 120, track database 165, loop database 170, and user database 175. In other embodiments, tracks and loops may be stored in a single database. In one embodiment, processor(s) 110 and memory 120 are included in a user device such as a mobile phone, for example, and may be configured to receive external data 180 via various input elements of the user device or via a network. In another embodiment, processors(s) 110, memory 120, and/or databases 165-175 are included on a server and configured to receive external data 180 via a network, for example. In still other embodiments, processor(s) 110 and/or memory 120 may be distributed across multiple devices in a system. External data 180 may include user input, information about a listener environment, information about user behavior, etc. in some embodiments. In various embodiments, functions of system 100 described herein may be performed by hardware, software, firmware, or a combination thereof.

Processor(s) 110, in the illustrated embodiment, are coupled to memory 120 and configured to execute program instructions stored in memory 120. In various embodiments, processor(s) 110 may include multiple processing cores and/or system 100 may include multiple processors. In the illustrated embodiment, processor(s) 110 are configured to process external data 180.

Memory 120, in the illustrated embodiment, stores program instructions that are executable to perform various operations, including those of music generator 130. Memory 120 may be a non-transitory computer-readable storage medium, in various embodiments. In some embodiments, memory 120 may be distributed, e.g., with a portion of memory 120 included in a server and a portion included in a user device. In addition to program instructions, memory 120 may be configured to store various metadata indicating musical attributes or other information, music content such as tracks or loops, user information, etc. in some embodiments.

As used herein, the term "loop" refers to sound information for a single instrument over a particular time interval. Loops may be played in a repeated manner (e.g., a 30 second loop may be played four times in a row to generate 2 minutes of music content), but loops may also be played once, e.g., without being repeated. As used herein, the term "track" may refer a single loop or to an interval that includes multiple loops that are "layered" on top of one another. Tracks also may or may not be played in a repeated manner.

Music generator 130, in the illustrated embodiment, includes user interface 135, mood controller 140, music constructor 145, intake analyzer 150, and instruments 155. In various embodiments, music generator may include additional elements in place of and/or in addition to those shown. In some embodiments, music generator 130 is configured to determine musical attributes based on external data 180. In these embodiments, music generator 130 is configured to generate music content based on the musical attributes. Exemplary musical attributes generated by music generator 130 may include tempo (e.g., specified in beats per minute), key (e.g., B Flat Major), complexity, energy, variety, volume, spectrum, envelope, modulation, periodicity, rise and decay time, noise, etc., in various embodiments. Music generator 130 may be configured to combine stored loops, stored tracks and/or generated loops to generate the music content.

As used herein, the phrase "music content" refers both to music itself (the audible representation of music), as well as to information usable to play music. Thus, a song recorded as a file on a storage medium (such as, without limitation a compact disc, flash drive, etc.) is an example of music content; the sounds produced by outputting this recorded file or other electronic representation (e.g., through speakers) is also an example of music content.

The term "music" includes its well-understood meaning, including sounds generated by musical instruments as well as vocal sounds. Thus, music includes, for example, instrumental performances or recordings, a cappella performances or recordings, and performances or recordings that include both instruments and voice. One of ordinary skill in the art would recognize that "music" does not encompass all vocal recordings. Works that do not include musical attributes such as rhythm or rhyme—for example, speeches, newscasts, and audiobooks—are not music.

One piece of music "content" can be distinguished from another piece of music content in any suitable fashion. For example, a digital file corresponding to a first song may represent a first piece of music content, while a digital file corresponding to a second song may represent a second piece of music content. The phrase "music content" can also be used to distinguish particular intervals within a given musical work, such that different portions of the same song can be considered different pieces of musical content. Similarly, different tracks (e.g., piano track, guitar track) within a given musical work may also correspond to different pieces of musical content. In the context of a potentially endless stream of generated music, the phrase "music content" can be used to refer to some portion of the stream (e.g., a few measures or a few minutes).

The present disclosure is concerned with computer-implemented generation of music content, such as by a software program or by computer hardware. The "generation" of music content refers to the creation of a combination of musical elements. As used herein, "generating" music content is distinct from "playing back" music content. Accordingly, a computer system that reads a computer audio file from a storage medium and outputs corresponding audio is not "generating" music content within the meaning of the present disclosure, but is instead playing back music content.

Music content generated by embodiments of the present disclosure may be "new music content"—combinations of musical elements that have never been previously generated. A related (but more expansive) concept—"original music content"—is described further below. To facilitate the explanation of this term, the concept of a "controlling entity" relative to an instance of music content generation is described. Unlike the phrase "original music content," the phrase "new music content" does not refer to the concept of a controlling entity. Accordingly, new music content refers to music content that has never before been generated by any entity or computer system.

Conceptually, the present disclosure refers to some "entity" as controlling a particular instance of computer-generated music content. Such an entity owns any legal rights (e.g., copyright) that might correspond to the computer-generated content (to the extent that any such rights may actually exist). In one embodiment, an individual that creates (e.g., codes various software routines) a computer-implemented music generator or operates (e.g., supplies inputs to) a particular instance of computer-implemented music generation will be the controlling entity. In other embodiments, a computer-implemented music generator may be created by a legal entity (e.g., a corporation or other business organization), such as in the form of a software product, computer system, or computing device. In some instances, such a computer-implemented music generator may be deployed to many clients. Depending on the terms of a license associated with the distribution of this music generator, the controlling entity may be the creator, the distributor, or the clients in various instances. If there are no such explicit legal agreements, the controlling entity for a computer-implemented music generator is the entity facilitating (e.g., supplying inputs to and thereby operating) a particular instance of computer generation of music content.

Within the meaning of the present disclosure, computer generation of "original music content" by a controlling entity refers to 1) a combination of musical elements that has never been generated before, either by the controlling entity or anyone else, and 2) a combination of musical elements that has been generated before, but was generated in the first instance by the controlling entity. Content type 1) is referred to herein as "novel music content," and is similar to the definition of "new music content," except that the definition of "novel music content" refers to the concept of a "controlling entity," while the definition of "new music content" does not. Content type 2), on the other hand, is referred to herein as "proprietary music content." Note that the term "proprietary" in this context does not refer to any implied legal rights in the content (although such rights may exist), but is merely used to indicate that the music content was originally generated by the controlling entity. Accordingly, a controlling entity "re-generating" music content that was previously and originally generated by the controlling entity constitutes "generation of original music content" within the present disclosure. "Non-original music content" with respect to a particular controlling entity is music content that is not "original music content" for that controlling entity.

Some pieces of music content may include musical components from one or more other pieces of music content. Creating music content in this manner is referred to as "sampling" music content, and is common in certain musical works, and particularly in certain musical genres. Such music content is referred to herein as "music content with sampled components," "derivative music content," or using other similar terms. In contrast, music content that does not include sampled components is referred to herein as "music content without sampled components," "non-derivative music content," or using other similar terms.

In applying these terms, it is noted that if any particular music content is reduced to a sufficient level of granularity, an argument could be made that this music content is derivative (meaning, in effect, that all music content is derivative). The terms "derivative" and "non-derivative" are not used in this sense in the present disclosure. With regard to the computer generation of music content, such computer generation is said to be derivative (and result in derivative music content) if the computer generation selects portions of components from pre-existing music content of an entity other than the controlling entity (e.g., the computer program selects a particular portion of an audio file of a popular artist's work for inclusion in a piece of music content being generated). On the other hand, computer generation of music content is said to be non-derivative (and result in non-derivative music content) if the computer generation does not utilize such components of such pre-existing content. Note some pieces of "original music content" may be derivative music content, while some pieces may be non-derivative music content.

It is noted that the term "derivative" is intended to have a broader meaning within the present disclosure than the term "derivative work" that is used in U.S. copyright law. For example, derivative music content may or may not be a derivative work under U.S. copyright law. The term "derivative" in the present disclosure is not intended to convey a negative connotation; it is merely used to connote whether a particular piece of music content "borrows" portions of content from another work.

Further, the phrases "new music content," "novel music content," and "original music content" are not intended to encompass music content that is only trivially different from a pre-existing combination of musical elements. For example, merely changing a few notes of a pre-existing musical work does not result in new, novel, or original music content, as those phrases are used in the present disclosure. Similarly, merely changing a key or tempo or adjusting a relative strength of frequencies (e.g., using an equalizer interface) of a pre-existing musical work does not produce new, novel, or original music content. Moreover, the phrases, new, novel, and original music content are not intended to cover those pieces of music content that are borderline cases between original and non-original content; instead, these terms are intended to cover pieces of music content that are unquestionably and demonstrably original, including music content that would be eligible for copyright protection to the controlling entity (referred to herein as "protectable" music content). Further, as used herein, the term "available" music content refers to music content that does not violate copyrights of any entities other than the controlling entity. New and/or original music content is often protectable and available. This may be advantageous in preventing copying of music content and/or paying royalties for music content.

When generating derived music content, pre-existing tracks may be combined in various ways. For example, referring to FIG. 3A, pre-existing music content 308 (e.g., a portion of a song) begins at the left dashed line, ends at the right dashed line, and includes multiple layered tracks/loops 301-305. In the illustrated example, track 303 ends at a particular point in time at which track 304 begins. In the illustrated example, track 306 begins in the middle of music content 308. Sampling music content 308 may include taking slices of music content 308 in the time dimension and inserting/layering the slices into generated music content. Sampling music content 308 may also include decomposing music content 308, e.g., by extracting track 304 and inserting/layering it with generated music content. In various embodiments, music content 308 or portions thereof may also be modified in other ways before combining with other content, including changing keys, changing tempo, modulation, equalization, etc.

Music content may also be classified using various parameters, such as a sampling parameter, a melody parameter, and a non-derivative parameter.

As used herein, the term "sampling parameter" refers to an amount of sampling used in the time dimension in music content. For example, for given music content, the sampling parameter refers to what percentage of the content in the time dimension includes sampled music over the interval of the music content. Exemplary ranges of acceptable sampling parameters include 0-10%, 0-20%, 0-30%, 0-40%, 0-50%, 0-60%, and 0-70%. In some situations, various parameters may be measured over a minimum time interval of music content such as 30 seconds or a few minutes, for example.

Further, as used herein, the term "melody parameter" refers to an amount of melody in the time dimension over a given interval of music content that is borrowed from other music content. For example, for a given number of measures of music content, all or a portion of those measures of the music content may include a melody borrowed from other music content. Exemplary ranges of acceptable melody parameters include 0-5%, 0-10%, 0-30%, 0-40%, etc. Melody parameters may also be specified as a ratio for particular intervals of music content. For example a melody parameter may specify that at most 2 measures of melody in any given 8 measures of content is pre-existing content. Other exemplary ratios include 1, 3 or 4 measures of pre-existing melody in 8 measures of music content, etc.

Still further, as used herein, the term "non-derivative parameter" refers to an amount of music content that is not derived from pre-existing content. For example, if half of the loops that are combined to generate music content are generated by software while the other half are stored pre-existing loops, the derivative parameter is 50%. The derivative parameter may be determined at the loop granularity, the track granularity, different time granularities, etc. For example, if 4 out of 10 combined tracks are pre-existing tracks, the non-derivative parameter would be 40%. Similarly, if a fourth of music content over a given interval included pre-existing content (which may or may not be layered with other content), the non-derivative parameter in time would be 40%. As discussed above, a minimum time interval, e.g., 30 seconds or a minute, may be defined for measuring this parameter. Exemplary ranges of acceptable non-derivative parameters include 10-100%, 30-100%, and 70-100%. In some embodiments, new music content is generated by combining tracks that are 100% non-derivative. In other embodiments, music content may be classified using other quantitative parameters in addition to and/or in place of those discussed herein.

As used herein, the phrase "combined music content" refers to generated music content that has at least one of the following properties:

A sampling parameter smaller than 60%
A melody parameter smaller than 10% or
A non-derivative parameter greater than 30%

Referring again to FIG. 2, in one embodiment, music generator 130 is configured to execute on a user device such as a mobile phone or personal computer. In other embodiments, all or a portion of music generator may be executed on a server at a different location from where music is actually played. For example, music generator 130 may be configured to stream music to a mobile application or a web application. In such embodiments, processor(s) 110 may be configured to couple to a network, either using a physical coupling or wirelessly. In some embodiments, music generator 130 is configured to generate "house" music. There are many existing tracks in the house music genre, and mechanisms for mixing house music tracks are well understood.

User interface 135, in some embodiments, may allow users, artists, customers, DJ's, etc. to interact with music generator 130, e.g., using a graphical user interface (GUI). User interface 135 may be installed as an application on a user device or may be a webpage, for example. In some embodiments, user interface 135 may include multiple different interfaces for different device types and may include both executable applications and web interfaces. For example, user interface 135 may include different interfaces for personal computers than for mobile devices. Further, user interface 135 may include different interfaces for different types of customers. Artists who upload tracks may use a different interface than users who stream music content. Similarly, commercial users may use yet another interface to customize external data 180 formats and types, for example.

Mood controller 140, in one embodiment, is configured to generate musical attributes based on external data 180. In one exemplary embodiment, a user may input a desired energy level, and mood controller 140 may be configured to generate tempo, key, and complexity attributes for music to match the energy level. Mood controller 140 may be configured to dynamically adjust musical attributes based on external data received while music generator 130 is generating music content, in real-time.

Music constructor 145, in one embodiment, is configured to generate music based on the musical attributes determined by mood controller 140. In one embodiment, music constructor 145 is configured to use stored tracks and/or loops and/or loops generated by instruments 155 to generate original music content. Music constructor 145 may be configured to adjust layering or mixing of tracks/loops based on changing musical attributes from mood controller 140 in real-time. Music constructor 145 may include various algorithms for making such transitions in a way that is pleasing to the listener, without noticeable breaks in generation of music content, using various techniques for dynamically changing tempo, key, etc. In various embodiments, music constructor 145 is configured to sample, layer, and/or insert tracks/loops to combine the tracks/loops to generate music content.

Intake analyzer 150, in one embodiment, is configured to determine musical attributes of uploaded tracks. In one embodiment, artists can upload tracks to be used by music generator 130. In some embodiments, intake analyzer 150 may perform spectral analysis which may analyze the timbre of input tracks, e.g., using Fourier transforms. Intake analyzer 150 may be configured to analyze various musical attributes such as spectrum, envelope, modulation, rise and decay time, noise, etc. In one embodiment, music generator 130 is configured to monitor use of uploaded tracks and artists may be compensated based on the amount their tracks are used in generating new music. In some embodiments, artists uploading tracks may be required to sign a licensing agreement (e.g., similar to the public licensing agreements for software) that allows re-use of uploaded content for non-commercial use. In some embodiments, artists may specify musical attributes of uploaded tracks in place of or in addition to intake analyzer 150 determining this information.

Instruments 155, in one embodiment, are configured to generate sound loops based on input musical attributes. Each instrument may be configured to generate a different type of sound loop, e.g., for a different musical instruments or for voices. Generated loops may be stored in loop database 170 in one embodiment. Sound loops generated by instruments 155 may be advantageous in some embodiments because they may be royalty-free. Generated sound loops may also be useful in situations in which music generator executes on a user device that is not coupled to a network and thus may be unable to download stored loops and tracks from a database. In one embodiment, mood controller 140 is configured to select instrument/track/loop types based on desired energy level.

In one embodiment, an application programming interface (API) may allow artists to generate their own instrument modules that generate sound loops based on input musical attribute information. These modules may be uploaded to a server and downloadable by other users. Similarly, in one embodiment, users may generate their own algorithms for mood controller 140, and these algorithms may be uploaded and shared with other users.

User database 175 may store user information and preferences. In one embodiment, user database 175 includes ratings history for users and may store links to saved music content generated for particular users. User database 175 may also store information for users/artists who submit tracks/loops, which may enable those users to be compensated for use of their tracks in generating music content. User database 175 may be configured to track popular loops/tracks and/or artists in order to improve the quality of generated music content by including more popular musical elements more often than less popular elements.

In some embodiments, music generator 130 is configured to save generated music content for sending to a user at a later time (as opposed to streaming content as it is generated). In some embodiments, this saved content may be stored in user database 175. In one embodiment, saved songs are classified and searchable by musical attributes. Thus, in one embodiment, users may listen to a particular "station" of pre-generated original music content for a particular mood, with particular musical attributes. In other embodiments, users may listen to stations that stream music content that is generated in real-time for particular musical attributes.

Exemplary Music Generator

Referring now to FIG. 2, a block diagram illustrating one embodiment of a portion of music generator 130 is shown. In the illustrated embodiment, mood controller 140 is configured to generate musical attributes (complexity, key, tempo, and energy in the illustrated embodiment) based on received external data. In the illustrated embodiment, music constructor 145 is configured to generate music content based on the musical attributes by layering tracks and/or loops from track database 165, loop database 170 and/or instrument 155.

Mood controller 140, in the illustrated embodiment, is configured to receive multiple inputs including musical attributes, words, environment information, and behavior information. In other embodiments, mood controller 140 may be configured to receive additional types of external data in addition to and/or in place of the types shown.

In one embodiment, mood controller 140 is configured to receive musical attributes directly from users. For example, a user interface may include dials or similar graphics that allow a user to directly adjust attributes such as tempo and key. In one embodiment, user input is simplified and a user simply inputs a desired energy level for a given type of music, or inputs some other more abstract musical attribute.

In one embodiment, mood controller 140 is configured to receive words associated with particular moods such as "happy," "relaxed" or "exercise" which may be used to determine corresponding musical attributes. Musical attributes may be classified into ranges that correspond to particular moods in this embodiment.

In one embodiment, mood controller 140 is configured to receive information about a listener environment. Examples of this information include lighting information and sound information. For example, based on conversation volume in a room, mood controller 140 may be configured to adjust musical attributes to avoid drowning out conversation or to increase generated music volume at a concert with a boisterous crowd. In one embodiment, sound information may be measured by microphones in user devices communicating with music generator 130. As another example, mood controller 140 may be configured to adjust musical attributes based on light intensity and/or color in a room.

In one embodiment, mood controller 140 is configured to receive information about user behavior. Behavior information may include, for example, information about user locations in a shopping mall or the number of purchases at point-of-sale terminals. In one embodiment, mood controller 140 is configured to store this behavior information and adjust generated musical attributes based on the behavior information. For example, particular musical attributes may result in better sales on Mondays but not on weekends, and mood controller 140 may be configured to store this information and adjust musical attributes accordingly. In one embodiment, this information may be stored separately for each customer (e.g., for each store in a shopping mall). In another embodiment, this information may be aggregated for multiple customers (e.g., across stores nationwide). In various embodiments, feedback loops may be implemented for any input to mood controller 140. In these embodiments, mood controller 140 may be configured to generate musical attributes to encourage or discourage various user behavior or, more generally, to affect any of various input parameters.

As described above, exemplary musical attributes may include tempo and key. Musical attributes may also include more abstract parameters such as energy, complexity, or variety. Complexity may refer to a number of loops or instruments that are included in a composition. Energy may be related to the other attributes or may be orthogonal to the other attributes. For example, changing keys or tempos may affect energy. However, for a given tempo and key, energy may be changed by adjusting instrument types (e.g., by adding high hats or white noise), complexity, volume, etc. Variety may refer to an amount of change in generated music over time. Variety may be generated for a static set of other musical attributes (e.g., by selecting different tracks for a given tempo and key) or may be generated by changing musical attributes over time (e.g., by changing tempos and keys more often when greater variety is desired).

In some embodiments, music generator 130 is configured to continuously generate music content, e.g., without a set beginning and end. Thus, music content may begin and end in response to user input, for example, and play continuously in between the beginning and ending. In order to provide variation, mood controller 140 may be configured to vary musical attributes. For example, mood controller 140 may be configured to change keys during generation of music content. In some embodiments, mood controller 140 is configured to use harmonic mixing, which involves well-known techniques for changing keys using the circle of fifths, for example. In some embodiments, music generator 130 is configured to insert quiet intervals into generated music content in order to add variety and may change keys and/or tempo after such quiet periods in order to simulate changing "songs" in the generated stream of music content.

Music constructor 145, in the illustrated embodiment, is configured to generate music content 210 based on received musical attributes. In the illustrated embodiment, music constructor 145 may also be configured to generate color information 220 and light information 230 based on the received musical attributes. In various embodiments, music constructor 145 is configured to assemble received tracks/loops in order to generate music content based on external data. Techniques for layering tracks/loops and phrasing or shaping of loops are well known. Phrasing may be associated with the number of beats per loop, and loops may be layered and repeated in a way that sounds appealing to listeners. Layering may be one technique for mixing or combining sound loops.

In various embodiments, any of various appropriate algorithms may be implemented to select loops and/or tracks that are compatible (e.g., in the same key or having similar tempos). It is well understood that music in specific keys evokes certain emotions. For example, a Beethoven piano concerto in B flat has a different qualitative "feel" than the same piece played in C minor. Likewise, it is well known in music theory that specific keys can work together and create pleasing music, whereas other keys do not work well together and result in noise when they are combined. Music generator 130, in some embodiments, is configured to generate original music to match various different moods or feelings by determining sets of musical attributes for each mood or feeling.

In order to vary generated music over time, music constructor 145 may be configured to switch out tracks/loops in a random or pseudo-random manner, whether or not musical attributes change. This randomness may also be user-configurable. This randomness may be related to variety or may be orthogonal to variety (for example, variety can be intentionally increased in a non-random manner but can also be increased by increasing randomness). In one embodiment, music constructor 145 is configured to change the mix of tracks/loops in a relatively continuous fashion such that the generated music content appears to change throughout a listening period.

In the illustrated embodiment, music constructor 145 is configured to receive tracks from track database 165 and loops from loop database 170 and instrument 155. In one embodiment, music generator 130 is configured to store and process tracks and loops together rather than treating them differently.

Track database 165, in some embodiments, is configured to store tracks uploaded from users and/or tracks generated by music constructor 145. In the illustrated embodiment, track decomposer 250 is configured to break down tracks into loops (e.g., of single instruments) to be stored in loop database 170. In other embodiments, music generator 130 may not be configured to decompose tracks into loops. In the illustrated embodiment, track database 165 and loop database 170 are configured to store metadata for each track/loop that indicates tempo, key, length, and type. Length information may include the length of a track/loop and or phrase boundary information. Type may refer to a category of instrument, e.g., drums, strings, voice, acoustic, etc. Types may not be mutually exclusive; a guitar, for example, may be both a string type and an acoustic type. In other embodiments, various elements of music generator 130 may be configured to store other metadata in addition to and/or in place of the particular metadata types described herein.

Loop database 170, in one embodiment, is configured to store loops generated by one or more instruments 155 and/or loops uploaded by users or decomposed from tracks uploaded by users.

Instrument 155, in one embodiment, may be configured to generate sounds for a particular instrument based on tempo, key, and length inputs. In some embodiments, music generator 130 includes multiple instruments 155 for generating sound loops to inject new loops into generated music and/or when stored loops/tracks are not available. In another embodiment, a single instrument 155 includes one or more "type" inputs, and is configured to generate sound loops for various types of instruments. In some embodiments, instrument 155 may be configured to generate sound, color, and/or light information corresponding to generated sound loops.

In the illustrated embodiment, track database 165, loop database 170, and instrument 155 are configured to provide tracks/loops to music constructor 145 based on musical attributes determined by mood controller 140. In one embodiment, music constructor 145 is configured to modify tracks/loops that do not match desired musical attributes. For example, music constructor 145 (and/or some other element of music generator 130) may be configured to adjust tempo, key, etc. of received tracks/loops in order to obtain a plurality of tracks/loops with desired musical attributes.

In various embodiments, the functionality described herein for particular elements may be performed by any of various appropriate elements in a system. The illustrated embodiment illustrates one possible combination of elements, but other combinations are contemplated.

Exemplary Environments

In one exemplary environment, music generator 130 is configured generate music content for a restaurant. In this environment, music generator 130 may receive environment information such as lighting intensity and/or color, ambient noise, number of patrons, etc. Music generator 130 may receive this information from individual user devices at the restaurant and/or devices owned by the restaurant. For example, the user devices and/or restaurant devices may visit a particular website or indicate the restaurant as a current location on a software application. Further, users in the restaurant may indicate their desired energy level, or desired attributes like "quiet" or "exciting." Still further, the restaurant may store user information such as number of sales, etc., which may be associated with musical attributes and used to determine musical attributes for future music content. Generally, in some embodiments, music generator 130 may be configured to use various feedback loops to affect inputs such as ambient noise or number of patrons and may be configured to attempt increase, decrease, and/or stabilize such inputs. Based on all or a portion of such information, music generator 130 may be configured to combine tracks to generate music content based on determined musical attributes. For example, music generator 130 may be configured to generate less complex music with a lower volume when it determines that there is significant ambient noise in the restaurant, in order to avoid drowning out conversation. Similarly, music generator 130 may be configured to re-use musical attributes that result in greater sales volume in the restaurant.

In some embodiments, music generator 130 may also be configured to generate ambient art to accompany music content. Ambient art may be generated based on artistic attributes such as complexity, color palette, or tone (e.g., darkness or lightness). Music generator 130 may be configured to determine artistic attributes using similar techniques as those described herein for determining musical attributes. Thus, music generator 130 may generate or classify and store artistic elements, and layer elements with similar attributes based on external data to generate ambient art.

In another exemplary environment, music generator 130 may be used in a club environment as a virtual DJ. For example, users may indicate their desired energy level and/or specific musical attributes. Music generator 130 may be configured to aggregate and/or average this information in order to determine musical attributes to generate music content. In some embodiments, music generator 130 may be configured to generate light control information to adjust lighting in the club. Further, music generator 130 may be configured to generate sound information to be played on user devices in the club and/or light control information to adjust lights on user devices. For example, based on location of user devices, music generator 130 may be configured to generate waves of sound and/or light that ripple among devices of a group of listeners at the club, along with the beat of the generated music content. Similarly, on some embodiments, music generator 130 may be configured to generate vibration control information for user devices. For example, an DJ might instruct patrons to perform a particular action or dance move when their phone vibrates, and send vibration information to user devices based on location in order to choreograph patron participation with the music. Location of user devices may be determined, in various embodiments, by global navigation systems such as GPS, radio triangulation techniques (e.g., using cellular signals, WIFI, or BLUETOOTH), user input (e.g., indicating a particular part of the club), etc. Music generator 130 may be configured to determine which users should receive control data (e.g., which users are present at the club) based on users that are currently using a mobile application or website associated with music generator 130. For example, users may be using a mobile application to input their energy preference using user interface 135 or to "check-in" to the club using a separate application such as FOURSQUARE or FACEBOOK. In one embodiment, users may upload sound loops while listening to generated music content, and the sound loops may be adjusted and used in the music content. For example, a user may sing or rap "Bob Jones is here, let's get the party started" into his mobile device and this loop may be sampled and combined in the generated music content. In this embodiment, music generator 130 may send light information to devices of users who have uploaded sound loops that are currently being used, in order to recognize those users in the club environment. For example, users who have uploaded currently-used sound loops may receive control information for a flashing strobe light on their mobile application.

In one embodiment, music generator 130 is not configured to generate original music content, but is configured to generate light/vibration/sound control information and handle switching between stored songs, e.g., using harmonic mixing. In this embodiment, music generator 130 may be configured to aid or take the place of a DJ.

In some embodiments, a commercial customer (e.g., a restaurant or club owner) may register for a commercial account and pay a monthly fee for channels that target their desired demographic. In some embodiments, a user or customer may customize external data provided to music generator 130. For example, music generator 130 may include an API that allows other software applications to generate musical attributes or other external data and provide this data to mood controller 140. This may allow commercial customers to customize their own algorithms for determining musical attributes and provide the musical attributes directly to music constructor 145, for example.

In some embodiments, music generator 130 may interface with popular DJ software such as TRAKTOR, SERATO, REKORDBOX, ABELTON LIVE, etc. A DJ may use music generator 130 to generate or select tracks and loops associated with particular desired attributes. Further, DJ's may upload their tracks to be used for further mixing by music generator 130. DJ's may also use music generator 130 to control light, sound, and or vibration on user devices in a crowd. Music generator 130 may also be configured to use tracks from repositories such as BEATPORT, for example.

Yet another exemplary environment is a user's residence. Music generator 130 may be configured to determine different music attributes based on lighting, activity level, time of day, day of the week, etc. and may be configured to learn preferences of a user in order to generate music content that is pleasing to the user throughout the day. This may allow a user to listen to inexpensive original music without interruption by advertisements, for example. In some embodiments, music generator 130 is configured to store generated music content to later be replayed by a user.

Additional Embodiments

Additional contemplated embodiments include:

1. A method, comprising:
determining, by a computer system, one or more musical attributes based on external data; and at least one of:
generating, by the computer system, new music content based on the one or more musical attributes;
generating, by the computer system, combined music content based on the one or more musical attributes;
generating, by the computer system, protectable music content based on the one or more musical attributes; and
generating, by the computer system, available music content based on the one or more musical attributes.

1. A method, comprising:
determining, by a computer system, one or more musical attributes based on external data; and at least one of:
generating, by the computer system, music content with a particular melody parameter based on the one or more musical attributes;
generating, by the computer system, music content with a particular sampling parameter based on the one or more musical attributes; and
generating, by the computer system, music content with a particular non-derivative parameter based on the one or more musical attributes 1. A method, comprising:
determining, by a computing system, one or more musical attributes based on external data; and
combining, by the computing system, a plurality of tracks to generate music content, wherein each of the plurality of tracks is:
selected based on the musical attributes; or
generated based on the musical attributes.

2. The method of claim 1, wherein the external data includes information about a listener environment.

3. The method of claim 2, wherein the external data includes at least one of: a light intensity and a noise level.

4. The method of claim 1, wherein the external data includes user behavior information and wherein the determining the one or more musical attributes includes changing one or more musical attributes in response to past user behavior.

5. The method of claim 4, wherein the user behavior information includes a number of items purchased at one or more sale terminals over a given time period.

6. The method of claim 1, further comprising:
generating light control information based on the musical attributes.

7. The method of claim 6, further comprising:
sending the light control information to a plurality of user devices based on locations of the plurality of user devices.

8. The method of claim 1, further comprising:
playing the music content using one or more audio devices; and
generating sound information based on the musical attributes, wherein the sound information is usable to play sounds on one or more user devices at the same time the music content is played using the one or more audio devices.

9. The method of claim 1, further comprising:
receiving a track from an artist;
including at least a portion of the track in the music content.

10. The method of claim 9, further comprising:
determining a payment amount for the artist based on an amount of use of the track over a given time period.

Other additional contemplated embodiments include:

1. A non-transitory computer-readable storage medium having instructions stored thereon that are executable by a computing device to perform operations comprising:
determining one or more musical attributes based on received data; and
combining a plurality of tracks to generate music content, wherein each of the plurality of tracks is:
selected based on the musical attributes; or
generated based on the musical attributes.

2. The non-transitory computer-readable storage medium of claim 1, wherein the combining includes layering one or more of the tracks.

3. The non-transitory computer-readable storage medium of claim 1, wherein the combining includes sampling one or more of the tracks.

4. The non-transitory computer-readable storage medium of claim 1, wherein each of the plurality of tracks includes sounds for only one instrument.

5. The non-transitory computer-readable storage medium of claim 2, wherein the operations further comprise:
combining one or more additional sound loops with one or more of the plurality of sound loops to generate further music content, wherein the combining is performed while playing the music track and is based on second external data received while playing the music track.

6. The non-transitory computer-readable storage medium of claim 1, wherein the musical attributes include two or more attributes selected from the group consisting of: tempo, key, energy, and complexity.

7. The non-transitory computer-readable storage medium of claim 1, wherein the external data includes input from one or more users.

8. The non-transitory computer-readable storage medium of claim 7, wherein the input includes a desired energy level.

9. The non-transitory computer-readable storage medium of claim 7, wherein the input includes a user rating of generated music content.

10. The non-transitory computer-readable storage medium of claim 7, wherein the external data includes input from multiple users listening to the music content.

Still other additional contemplated embodiments include a hardware system configured to perform the various functionality described above with reference to embodiments of a method and embodiments of a non-transitory computer-readable storage medium.

Exemplary Method

Referring now to FIG. 3, a flow diagram illustrating one exemplary embodiment of a method 300 for generating music content is shown. The method shown in FIG. 3 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 310.

At block 310, one or more musical attributes are determined based on external data. Examples of external data include user input of various types, environmental information such as lighting or sound information, behavior information such as location information or purchase information, feedback information such as user rating information, etc. Rating information may be specified in various forms including numerical ratings, like/dislike options, "star" ratings, etc. Determining musical attributes may include using various algorithms to generate attributes based on external data. Some of the algorithms may include inputs for past user preferences or behavior, in order to adjust the algorithms to better match music to user moods. Such algorithms may include various rules and heuristics for controlling the generated music content. Flow proceeds to block 320.

At block 320, a plurality of tracks are combined to generate music content based on the musical attributes. In this embodiment, the tracks are either selected (e.g., from a database) or generated (e.g., by instrument 155) based on the musical attributes. In some embodiments, selecting tracks may include adjusting tracks/loops that are close to having the musical attributes such that they match the musical attributes. For example, a track with a tempo of 112 beats per minute may be slightly stretched to generate a track with a desired tempo of 110 beats per minute. In some embodiments, music generator 130 is configured to generate light and/or sound control information in addition to the music content. Flow ends at block 320.

* * *

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    determining, by a computing system configured to cause output of music content at one or more listening areas, environment information indicative of attributes associated with at least one of the one or more listening areas, wherein at least a portion of the environment information is received from a mobile device of one or more listeners to the output music content and indicates a number of listeners;
    determining, by the computing system, a plurality of musical attributes based on the environment information;
    selecting or generating, by the computing system, a plurality of tracks based on the plurality of musical attributes; and
    combining, by the computing system, the plurality of tracks to generate output music content.

2. The method of claim 1, wherein the combining includes layering two or more of the plurality of tracks such that the two of more of the plurality of tracks overlap in time within the output music content.

3. The method of claim 1, wherein the environment information includes ambient noise information.

4. The method of claim 1, further comprising:
    adjusting the musical attributes in order to effect a change in future measured environment information.

5. The method of claim 4, wherein the adjusting includes utilizing a feedback loop to stabilize the environment information near a desired value.

6. The method of claim 4, wherein the adjusting is based on past response to similar musical attributes.

7. A non-transitory computer-readable storage medium having instructions stored thereon that are executable by a computing device to perform operations comprising:
    causing music content to be played;
    determining environment information associated with one or more users listening to the music content, wherein at least a portion of the environment information is received from a mobile device of a listener to the music content;
    determining a plurality of musical attributes based on the environment information;
    selecting or generating a plurality of tracks based on the plurality of musical attributes;
    combining the plurality of tracks to generate output music content; and generating light control information based on the plurality of musical attributes.

8. The non-transitory computer-readable storage medium of claim 7, wherein the plurality of musical attributes include at least two attributes selected from the group consisting of: tempo, musical key, complexity, volume, and energy.

9. The non-transitory computer-readable storage medium of claim 7, wherein the environment information includes lighting information.

10. The non-transitory computer-readable storage medium of claim 7, wherein the environment information includes a number of purchases made by users.

11. A system, comprising:
one or more memories having program instructions stored thereon; and
one or more processors configured to execute the program instructions to cause the system to perform operations including:
outputting music content at one or more listening areas;
determining a plurality of musical attributes based on environment information indicative of attributes associated with at least one of the one or more listening areas including sales information corresponding to the at least one of the one or more listening areas, wherein at least a portion of the environment information is received from a mobile device of a listener to the output music content;
selecting or generating a plurality of tracks based on the plurality of musical attributes; and
combining the plurality of tracks to generate output music content.

12. The system of claim 11, further comprising:
an audio output device configured to play the music content.

13. The system of claim 11, further comprising:
an audio input device configured to measure audio signals in the at least one of the one or more listening areas, wherein at least a portion of the environment information is based on the measured audio signals.

14. The system of claim 13, wherein the operations further comprise:
determining an ambient noise level based on the measured audio signals.

15. The system of claim 11, further comprising:
one or more light sensors configured to measure light signals in the area and generate at least a portion of the environment information as lighting information.

16. The system of claim 11, further comprising one or more point-of-sale terminals configured to determine the sales information.

17. A non-transitory computer-readable storage medium having instructions stored thereon that are executable by a computing device to perform operations comprising:
causing music content to be played;
determining environment information associated with one or more users listening to the music content;
determining a plurality of musical attributes based on the environment information;
selecting or generating a plurality of tracks based on the plurality of musical attributes;
combining the plurality of tracks to generate output music content; and
adjusting the musical attributes in order to effect a change in future measured environment information.

18. The non-transitory computer-readable storage medium of claim 17, wherein the adjusting includes utilizing a feedback loop to stabilize the environment information near a desired value.

19. The non-transitory computer-readable storage medium of claim 17, wherein the adjusting is based on past response to similar musical attributes.

20. A non-transitory computer-readable storage medium having instructions stored thereon that are executable by a computing device to perform operations comprising:
causing music content to be played;
determining environment information associated with one or more users listening to the music content, wherein the environment information includes lighting information;
determining a plurality of musical attributes based on the environment information;
selecting or generating a plurality of tracks based on the plurality of musical attributes; and
combining the plurality of tracks to generate output music content.

21. A non-transitory computer-readable storage medium having instructions stored thereon that are executable by a computing device to perform operations comprising:
causing music content to be played;
determining environment information associated with one or more users listening to the music content, wherein the environment information includes a number of purchases made by users;
determining a plurality of musical attributes based on the environment information;
selecting or generating a plurality of tracks based on the plurality of musical attributes; and
combining the plurality of tracks to generate output music content.

22. A non-transitory computer-readable storage medium having instructions stored thereon that are executable by a computing device to perform operations comprising:
causing music content to be played;
determining environment information associated with one or more users listening to the music content;
determining a plurality of musical attributes based on the environment information;
selecting or generating a plurality of tracks based on the plurality of musical attributes;
combining the plurality of tracks to generate output music content; and
generating light control information based on the plurality of musical attributes.

* * * * *